US010328364B2

(12) United States Patent
Ross et al.

(10) Patent No.: US 10,328,364 B2
(45) Date of Patent: Jun. 25, 2019

(54) DILUENT TREATED DRILLING WASTE MATERIAL RECOVERY PROCESS AND SYSTEM

(71) Applicant: RECOVER ENERGY SERVICES INC., Calgary, AB (CA)

(72) Inventors: Stan Ross, Cochrane (CA); Mike Biersteker, Calgary (CA); Wendell Palmer, Cochrane (CA); Paul Sudlow, Calgary (CA)

(73) Assignee: RECOVER ENERGY SERVICES INC., Calgary, AB (CA)

(*) Notice: Subject to any disclaimer, the term of this patent is extended or adjusted under 35 U.S.C. 154(b) by 138 days.

(21) Appl. No.: 15/447,877

(22) Filed: Mar. 2, 2017

(65) Prior Publication Data

US 2017/0252676 A1    Sep. 7, 2017

Related U.S. Application Data (60) Provisional application No. 62/303,172, filed on Mar. 3, 2016.

(51) Int. Cl.
| *B01D 21/26* | (2006.01) |
| *B01D 21/28* | (2006.01) |
| *E21B 21/06* | (2006.01) |
| *B01D 21/01* | (2006.01) |

(52) U.S. Cl.
CPC ........... *B01D 21/262* (2013.01); *B01D 21/01* (2013.01); *B01D 21/283* (2013.01); *E21B 21/065* (2013.01)

(58) Field of Classification Search
None
See application file for complete search history.

(56) References Cited

U.S. PATENT DOCUMENTS

| 5,256,289 A | 10/1993 | Cope et al. |
| 6,711,830 B2 | 3/2004 | Hensley et al. |
| 6,763,605 B2 | 7/2004 | Reddoch |
| 8,287,441 B2 | 10/2012 | Wick |

(Continued)

FOREIGN PATENT DOCUMENTS

| WO | WO-9108375 A1 * | 6/1991 | ........... B01D 11/028 |
| WO | 03/102359 | 12/2008 | |

OTHER PUBLICATIONS

International Preliminary Report on Patentability for PCT/IB2016/055033, dated Mar. 15, 2018.

*Primary Examiner* — Krishnan S Menon
*Assistant Examiner* — Bradley R Spies
(74) *Attorney, Agent, or Firm* — Greenblum & Bernstein, P.L.C.

(57) ABSTRACT

A process for removing hydrocarbons and water from hydrocarbon and/or water containing drilling waste. The process includes introducing hydrocarbon contaminated drill cuttings and a cleaning solvent into a solvent wash tank. Prior to introducing the hydrocarbon contaminated drill cuttings into a solvent wash tank, the hydrocarbon contaminated drill cuttings are treated with a hydrocarbon solvent such as hexane to break the surface tension of the hydrocarbons in a solvent sealed vertical centrifugal separator to remove hydrocarbons from the hydrocarbon contaminated drill cuttings, resulting in improved efficiency of the hydrocarbon removal process. Apparatus for performing the process is also described.

25 Claims, 6 Drawing Sheets

(56) References Cited

U.S. PATENT DOCUMENTS

| | | | |
|---|---|---|---|
| 8,668,634 B2 | 3/2014 | Wick | |
| 8,820,438 B2 | 9/2014 | Ross et al. | |
| 2003/0221331 A1* | 12/2003 | Reddoch | B04B 3/00 34/58 |
| 2012/0090898 A1* | 4/2012 | Ross | E21B 21/065 175/66 |
| 2014/0158431 A1* | 6/2014 | Anderson | E21B 41/005 175/57 |
| 2014/0371113 A1* | 12/2014 | Fout | E21B 21/066 507/117 |

\* cited by examiner

DILUENT TREATED DRILLING WASTE MATERIAL RECOVERY PROCESS AND SYSTEM

CROSS-REFERENCE TO RELATED APPLICATIONS

This application claims the benefit under 35 U.S.C. § 119(e) of U.S. Provisional Application Ser. No. 62/303,172 filed Mar. 3, 2016, the disclosure of which is expressly incorporated by reference herein in its entirety. This application is also related to commonly assigned, U.S. patent application Ser. No. 62/212,754, filed on Sep. 1, 2015, Ser. No. 62/303,169 entitled Gas Tight Shale Shaker For Enhanced Drilling Fluid Recovery And Drilled Solids Washing filed of even date herewith, and Ser. No. Ser. No. 62/303,163 entitled Gas Tight Horizontal Decanter For Drilling Waste Solids Washing filed of even date herewith, the disclosures of all three which are herein incorporated by reference in their entirely.

TECHNICAL FIELD

The field of art to which this invention generally pertains is the processing of drilling waste.

BACKGROUND

During the drilling of a well, for example for gas or oil, drilling mud is typically pumped down the drill string through a drill bit. The drilling mud simultaneously cools the bit and carries drill cuttings up the well bore. Drilling mud is typically comprised of a fluid (or fluids), and mixture of additives which can be either fluids or solids, forming a useable drilling fluid. Oil base drilling fluids are often used to drill oil and gas wells because they have special characteristics that make them a better cooling/carrying fluid than other drilling muds. Additionally, such drilling muds may offer better wellbore stability and/or lubricity for the drill string in modern, horizontal wellbores.

Typically, the drill cuttings which are carried up the wellbore are subjected to solids separating devices when the cuttings exit the wellbore, such as that of shale shakers or decanter centrifuges. These mechanical separators allow a substantial portion of the drilling mud to be returned to the storage tanks for reuse, while the drill cuttings portion is sent to separate storage tanks. The drill cuttings still contain residual amounts of the drilling mud that couldn't be separated through mechanical means, and this residual drilling mud is considered to be contamination.

The drill cuttings are commonly known as drilling waste, because they serve no purpose after they have been removed from the wellbore. Thus, the contaminated drill cuttings are typically stabilized with a bulking agent, such as fly-ash, sawdust, or liquid absorbing pellets, to prevent residual free liquids from leaching from the solids during transport. The cuttings are then typically transported to a secure landfill where they are stored for an indeterminate period of time, typically generations.

With the evolution of new technologies such as thermal extraction, solvent washes, and alternate mechanical separators, and the increasing cost of drilling fluids, the ability to, and benefits of, reclaiming materials from the drilling waste, such as various components of the drilling fluids, is increasing.

Accordingly, there is a constant search for new technologies and improvements to existing technologies to increase the efficiency and effectiveness of reclaiming processes.

BRIEF SUMMARY

A process for separating liquid phase-solid phase oil based drilling mud-containing drill cuttings, is described including flowing the drilling mud-containing drill cuttings through a vertical cuttings dryer to cause at least a portion of the liquid phase drilling mud to separate from the solid phase, wherein at least one diluent is added to the oil based drilling mud containing drill cuttings to lower the yield point of the diluent-liquid phase mixture and enhance liquid phase recovery, the entire process being performed in a gas-tight environment preventing escape of diluent from the process into the external atmosphere and preventing introduction of oxygen containing air into the process from the external atmosphere.

Additional embodiments include: the process described above where the diluent is added to the oil based drilling mud containing drill cuttings prior to the mixture being conveyed into the vertical cuttings dryer; the process described above where the recovered liquid phase from the vertical cuttings dryer is collected and processed in a gas tight decanter centrifuge so that additional solids can be removed from the liquid phase prior to distillation; the process described above where the vertical cuttings dryer additionally contains a feed inlet, and a processed solids outlet, and a recovered liquids outlet, and/or additional vent inlets and outlets connected in a closed loop to promote a common atmosphere exchange; the process described above where the process described above where the atmosphere is exchanged at a rate greater than 500 cubic feet per minute and less than 3,000 cubic feet per minute; the process described above where a gas tight fan or blower is additionally utilized to promote the atmosphere exchange; the process described above where the at least one diluent is added to the oil based drilling mud-containing drill cuttings at a rate sufficient to reach a yield point of the liquids phase of the oil based drilling mud-containing drill cuttings equal to or less than 1.0 Pa, prior to the mixture entering the vertical cuttings dryer; the process described above where a diluent is added to the unstabilized drill cuttings at a rate sufficient to reach a plastic viscosity of the liquids phase of the oil base drilling mud-containing drill cuttings, equal to or less than 5.0 cP, prior to the mixture entering the vertical cuttings dryer; the process described above where the at least one diluent has a flashpoint less than or equal to 37° C.; the process described above where the mixture of the at least one diluent and liquid phase-solid phase oil based drilling mud-containing drill cuttings has a flashpoint less than or equal to 37° C.; the process described above where the at least one diluent has a vapor pressure equal to or greater than 0.1 Torr and less than 750 Torr; the process described above where the diluent is hexane; the process described above where the diluent is n-butyl alcohol; the process described above where the diluent is ethyl acetate; the process described above where the gas-tight environment is maintained below the minimum oxygen content required for ignition of the diluent; the process described above where the gas-tight environment additionally contains an inert gas; the process described above where the inert gas comprises one or more of nitrogen, carbon dioxide, or fuel gas; the process described above where the inert gas exerts a positive pressure in the process; the process described above where the liquid phase is collected in an effluent ring of the vertical cuttings dryer and is sent for additional fluids rehabilitation within a commonly connected gas tight atmosphere; the process described above where the recovered liquid phase from the effluent ring is collected and additionally processed in one or more of a gas tight settling tank, a gas tight clarifying tank or a gas tight decanter so that additional solids can be removed from the liquid phase prior to distillation; the process described above where a diluent is added to the oil based drilling mud-containing drill cuttings and the mixture is processed within a gas tight shale shaker to provide a partial pre-separation of the liquids phase and solids phase of oil based drilling mud-containing drill cuttings into a liquids phase containing more or less solids and solids phase containing less liquids prior to the solids phase being conveyed to the vertical cuttings dryer; the process described above where the liquids phase containing more or less solids from the gas tight shale shaker is collected and pumped to the effluent ring of the vertical cuttings dryer to flush the effluent ring; and the process described above where the solids phase containing residual diluent from the vertical cuttings dryer is operatively connected to a gas tight solids dryer to remove the residual diluent from the cleaned drill cuttings.

A drill cuttings cleaning system for cleaning hydrocarbon contaminated drill cuttings is also described, including a hopper or storage device for receiving the contaminated drill cuttings, operatively connected with the separation apparatus, including a hermetic seal between the contaminated drill cuttings feed hopper/storage device and the separation apparatus.

An additional embodiment includes the system described above where the hermetic seal comprises a fluids or solids trap with at least one of a rotary airlock, a feed pump, or an auger to prohibit the entry of air containing oxygen to the process, or the escape of a volatile diluent to the atmosphere while permitting the contaminated drill cuttings to pass in a controlled, measured rate.

These and additional embodiments are further described below.

DETAILED DESCRIPTION

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

Apparatus and methods to enhance the volume of oil based drilling fluid recovered from the unstabilized drill cuttings is described herein. This is accomplished by adding a diluent to the unstabilized drill cuttings and mechanically separating the two phases within a gas tight vertical cuttings dryer (commonly known as a Verti-G Dryer), prior to other types of solids processes or fluids rehabilitation processes.

For ease of understanding, as typically used the terms "Oil based mud", "Viscosity" and "Rheology" are provided as follows: Oil base mud (OBM) is a drilling fluid system that uses oil as the base ingredient, as opposed to water, which is the base used in gel-chem mud systems, brine mud systems or polymer mud systems. Oil base mud is also known as Invert, and it typically consists of a mixture of oil, emulsified water and drilling mud additives. Viscosity is best understood as the thickness of a fluid. For example, water has relatively low viscosity, whereas ketchup has a higher viscosity. Rheology, is the science explaining liquid flow including flow in "soft solids". One of the important Rheology properties of OBM is the 'yield point', or the carrying capacity of the fluid. A small solid dropped in a glass of water demonstrates a fluid with no yield point, because the small solid will drop regardless of its size. The same size solid in ketchup may not drop at all because the force of gravity may not be strong enough to break the yield point of the milk shake. If it is heavy enough to exceed the yield point of the fluid it will drop more slowly than the same size solid in water due to the higher viscosity of the milk shake. As with ketchup, invert is a non-Newtonian fluid and it is commonly modeled as a Bingham Plastic. Bingham Plastics behave like a solid, up to a particular amount of shear stress, when they behave like a liquid; this is known as the yield point of the fluid.

OBM's are typically comprised of a mixture of additives which can be either fluids or solids, collectively forming a useable drilling fluid. OBM's are used by well operators when special fluid characteristics are required including, better cooling/carrying capacity, or better wellbore stability, and/or lubricity for the drill string in horizontal wellbores, which are becoming more common.

Typically, the drill cuttings which are carried up the wellbore are subjected to solids separating devices when the cuttings exit the well bore, such as that of shale shakers or decanter centrifuges. These mechanical separators allow a substantial portion of the liquids phase to be recycled for reuse, while the solids phase is stabilized, stored for a short period of time and transported to landfill for long term storage.

Shale shakers are considered the first line of defense on a drilling rig, for recapturing drilling fluid that would otherwise be lost to the drill cuttings. They are a highly effective mechanism for bulk liquids recovery and very inexpensive when compared to other conventional forms of solids control, like that of centrifuges for example. While all shale shakers operate on the same basic principal, they do come in a variety of models, which offer differing gravitational forces, coarse to very fine screen sizes, differing vibratory motions, vacuum or air flow to assist the liquids phase movement through the screen, and as few as one screen, or as many as four, on one or more screen bed elevations.

Shale shakers apply force, usually measured in terms of gravitational forces, ranging between four to eight times greater than earth's gravity. The principals behind a vibratory screen is to create a bed where the solids and liquids phase "bounce", causing the liquids phase to yield under the stresses of the gravity and shaker forces. The yield point is the point where the Bingham Plastic liquids phase transitions from behaving like a solid, to acting as a liquid. Acting as a liquid provides an opportunity for the liquids phase to be thrown from the solids phase, and drop through the low micron screen of the vibratory bed. The liquids phase can then be returned directly to a processing tank, or be collected in an attached hopper or hose, and redirected to another process such as that of centrifuges, hydro cyclones, or membranes, for further fluids rehabilitation. Additional fluids rehabilitation is required because conventional shale shakers are a good mechanism to remove a substantial amount of liquids from the solids. However, this fluid typically contains low micron/low gravity solids that would otherwise travel through the porosity of the vibratory screen, rather than be caught on the upper side of the screen with the larger solids.

Horizontal decanter centrifuges are commonly used to remove the low micron solids that otherwise pass through the shale shaker screens. A typical drill site decanter can exert gravitational forces in excess of 1000 times that of Earth's gravity, and as much as 3000 times Earth's gravity force. These forces are capable of removing substantial volumes of low gravity solids, also known as drilled solids, before the low micron/low gravity solids volume can accumulate and become problematic to the drilling operation. Decanters have many design and operating parameters including shorter or longer beach lengths for example, or shallow or deeper weir settings to facilitate longer fluids retention or a dryer solids discharge. It is up to the designers and operators of the decanter to balance the horizontal decanter parameters against the specific needs of the drill site.

Figure 1:
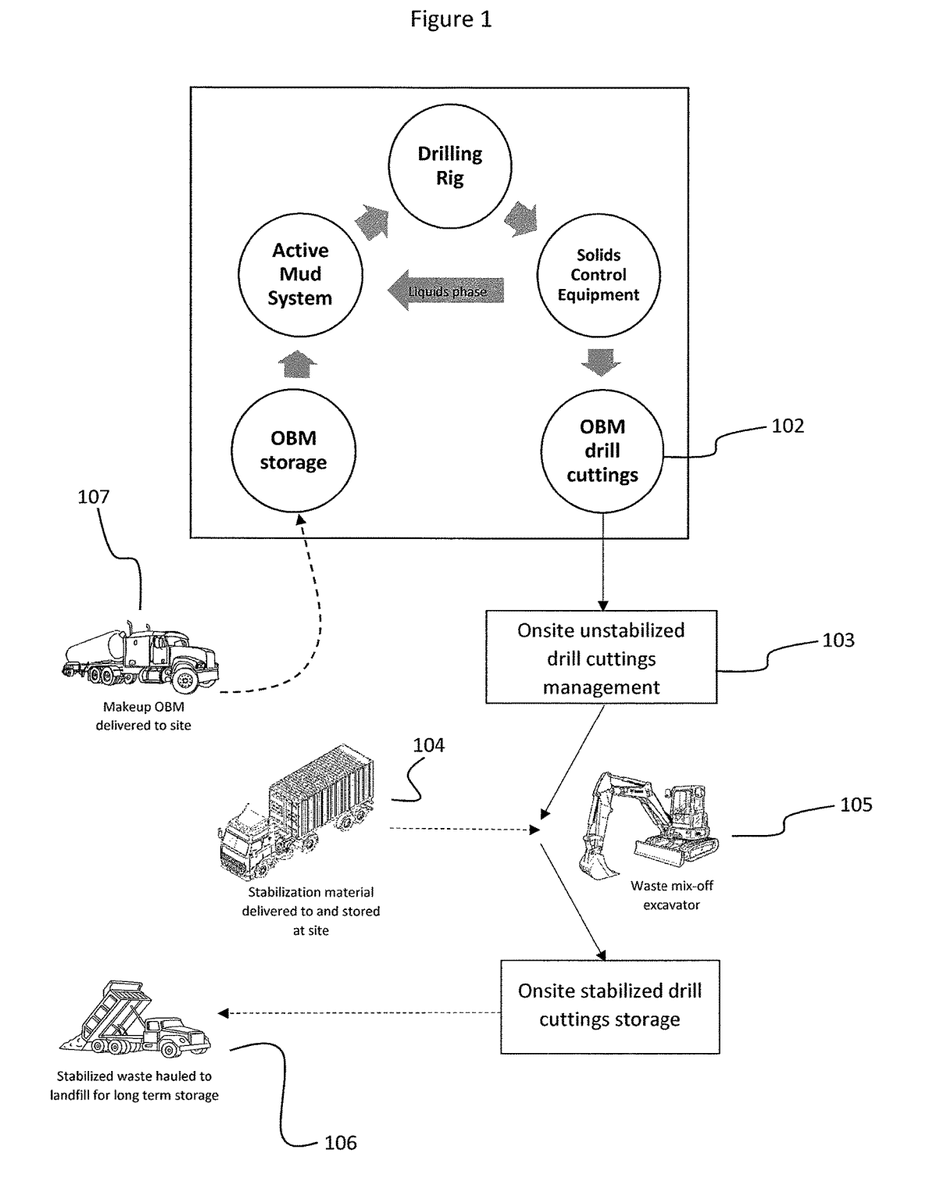
FIG. 1 demonstrates a typical on site drilling rig fluids and solids management operation.

As illustrated in FIG. 1, the typical current practice by which drill cuttings (102) (from the shale shaker) and low gravity solids underflow (102) (from the onsite decanter) are managed at the drill site by collecting the drilling waste in three or four sided bins (103) and mixing it with a stabilizing agent (104), for example sawdust or liquids absorbing pellets, to absorb the free leachable fluids. The mix off is typically done by means of a wheeled loader or track excavator (105). The stabilized drilling waste can then be transported safely using conventional transport methods, such as sealed end dump trailers. The stabilized drilling waste is transported to specially designed landfills (106) featuring leachate collection systems and impervious liners. Landfills are built for long term storage. Makeup OBM is transported to the site (107) to cover the OBM losses resulting from the mix off process.

Thus is the need for an improved method to remove a substantial portion of the oil on cuttings.

In recent years, advancements have been made to better facilitate recovery of OBM from drill cuttings. One-example of an oil recovery process is an Oil Recovery Unit (ORU) and described in U.S. Pat. Nos. 8,287,441 and 8,668,634. These patents detail a process where unstabilized OBM drill cuttings are collected from a conventional shale shaker and conveyed into a horizontal decanter centrifuge. Specifically, an auger delivers the "wet" drill cuttings into the horizontal decanter that is designed to accept heavy, (greater than 50%) solids laden material. The material spills from the auger delivery system and falls into the big bowl decanter which is spinning at such a rate that the drill cuttings are subjected to substantial centripetal forces, for example, 1,000 to 2,000 g-forces. This force causes the heavier solids to settle along the inner wall of the bowl while the liquids phase leaches into the pond section of the horizontal decanter. The solids phase is conveyed to the conical end where it moves up the beach of the centrifuge and is ejected from the bowl section via wear resistant ports. The technology is at least partially effective at removing free liquids on drill cuttings waste, generally achieving a residual liquids of 20% to 50% (by volume), and as low as 10% residual liquids (by volume). The liquids phase flows in the opposite direction from which the solids are conveyed, and is collected at the opposite end of the bowl where the liquids phase spills over the weirs of the bowl section. This method of separating the liquids phase and solids phase is unique in that the bowl allows for both a significant removal of the OBM drilling fluid from the drill cuttings and could also achieve a simultaneous reduction of low gravity solids from the liquids phase, which can be as little as approximately 5% solids (by volume).

While the technology described in U.S. Pat. Nos. 8,287,441 and 8,668,634 is capable of reclaiming more oil base mud than conventional shale shakers alone, it has several drawbacks including:

1) The equipment described are of a substantial capital investment and require one or more onsite operators be present to monitor the equipment when in operation. Given that a drilling rig typically only uses OBM for two weeks of a typical four week well, it also means that the technology can only be utilized for 50% of the time, while sitting idle the other 50% of the time.
2) For the equipment described to function at its greatest potential, additional heat energy is required, to alter the viscosity of the liquids phase, which is contaminating the drill cuttings. Ideally, the process should maintain a minimum feed temperature of approximately 50° C., which means additional power must be used for the process to function at its greatest potential. Given drilling rigs are always operating in remote areas and otherwise do not have access to grid electricity, diesel powered generators must typically be used to supply the required electric energy. To quantify the significance of the heat energy input, one must consider the fact that it takes 1837 BTU's to raise the temperature of 1 m³ of unstabilized drill cuttings containing 30% hydrocarbons (by volume) and 5% water (by volume), by 1° C.; this presumes there is no loss of heat energy due to inefficiencies in the design.
3) As mentioned, the technology can reclaim substantially more oil base mud than conventional shale shakers, but it still leaves approximately less than 15% fluids by volume and typically greater than 5% fluids by volume on the drill cuttings. Given the residual contamination is still high enough to emit a distinct odor of hydrocarbons, and the residual contamination is still visually obvious, the marketability of such a technology as "environmentally advantageous" is extremely limited.
4) Issues also exist relating to gearbox sizing and the subsequent inability to keep up with fast hole drilling. Generally, decanter centrifuges are designed to process a slurry with a solids phase of less than 20% (by volume). Dewatering a heavy solids phase is limited by torque in the gear box and subsequently, the technology described in U.S. Pat. Nos. 8,287,441 and 8,668,634 is unable to keep up with fast hole drilling where greater than five cubic meters of oil based drilling mud contaminated drill cuttings are generated each hour.

Another example of an oil recovery and solids washing technology is discussed in commonly owned U.S. Pat. No. 8,820,438, the disclosure of which is herein incorporated by reference, wherein a solvent washing process is employed to dissolve the oil on cuttings, by introducing the unstabilized drill cuttings into an inclined auger tank filled with solvent as the wash medium. The solids are caused to interact with the solvent by means of an auger stirring-while-conveying the solids phase up the wash tank within a counter-current flow of clean solvent. The internal mixing that occurs within the wash tank allows the diluent to dissolve the OBM while eliminating the yield strength of the OBM has on the drilled solids. After a residence time of approximately 20 minutes in each wash tank, the liquid is substantially separated from the drill cuttings which are moved to a drying process wherein the solvent is recovered for reuse and the clean cuttings are ejected from the process. The solvent and liquid contain residual low gravity solids which are removed using a gas tight decanter which is capable of applying sufficient force to the liquids phase to remove the low gravity solids. This solids phase removed by the polishing decanter is also moved to a drying process for solvent recovery, while the solids free liquid phase is sent to a distillation column or flash kettles for solvent recovery. Air is purged and prevented from entering the process by a blanket gas system in combination with seals and fluid legs. Oxygen analyzers are used to ensure that oxygen concentration in the vapor is well below the explosive limit.

While the technology described in U.S. Pat. No. 8,820,438 is a significant step forward in cleaning hydrocarbon contaminated drill cuttings, there is still room for improvement. For example:
1) The equipment described could cost significant dollars and require one or more onsite operators be present to monitor the equipment when in operation. Given that a drilling rig typically only uses OBM for two weeks of a typical four week well, it also means that the technology can only be utilized for 50% of the time, while sitting idle the other 50% of the time
2) To build a commercial processor, centralized to active drilling fields, the processor would need to be built such that it could process a significant throughput each hour, for example, 10 m³ per hour of unstabilized drill cuttings throughput. Such a throughput would require a minimum of four double screw wash tanks, each capable of processing 2.5 m³ per hour, as well as the supporting process equipment. To explain the significance of such, consider the following:
   a) The foot print for each wash tank with the supporting feed hopper and solids dryer measures approximately 2.5 meters (wide) by approximately 24 meters (long) by approximately 3 meters tall;
   b) Each double screw wash tank requires two 10 horse power (hp) motors and gearboxes (for the wash screws), two 3 hp motors and gearboxes (for the lower feeder screws), two 5 hp motors and gearboxes (to convey the cuttings from the feeding hopper to the lower feeder screws), one 2 hp solvent pump (for the lower injection), one 2 hp solvent pump (for the upper injection), at least one oxygen measurement device per wash tank, and one double screw dryer to accept the solids phase from each of the four wash tanks. Further, the electrical support equipment required to distribute the required power to each device, and that the electrical control equipment will need to be located away from the process, outside of the explosion proof electrical zoning. Further, each motor will of course require an electrical tub with either a variable frequency drive or contactor, an isolator, a breaker, and a communications port to be routed back to the operator interface equipment.
3) A commercial processor with a solids capacity of 10 m³ (cubic meters) per hour would also require a solvent recovery flash kettle, distillation tower, or combination of both, capable of recovering 20 m³ of solvent per hour, which is necessary to maintain a solvent to drill cuttings ratio of 2:1, which is required maintain solids control in a single gravity force wash tank design Considering the forgoing, one can appreciate the complexity of such a design, and the probability of equipment fracture with so many independent, rotating components.

Another example of an OBM recovery system is the use of a Vertical Cuttings Dryer, also known as a Verti-G dryer. Verti-G dryers use centripetal force to exceed the yield point of the fluid and throw it through a screen where it is collected in the liquid ring (also known as the effluent ring). The solids are conveyed downward using an auger/scraper, along the inner side of the screen until they fall off the conical screen, into an open bottom hopper. From there, they are conveyed from the Verti-G dryer to temporary storage. Typically, a Verti-G Dryer can recover up to two thirds of the OBM from drill cuttings, leaving a stackable solids phase that is typically ready for transport to a landfill. The recovered fluids are polluted with low gravity solids and in need of substantial fluids rehabilitation. The reason substantial fluids rehabilitation is required is because the Verti-G dryer uses an auger to scrape the cuttings off/downward of the screen which causes substantial partial degradation, thereby causing a significant increase in low micron solids passing through the narrow wedge-wire screen. Despite the Verti-G dryer generating sufficient centripetal forces to alter the fluid rheology and allow the liquids phase to leave the larger drill cuttings, the screen and scraper system is built such that both the liquids phase and solids phase of the slurry are encouraged to try and migrate the narrow passages of the wedge-wire screen. Given the yield point of the liquids phase is still high enough to carry some solids, the low micron solids from the slurry, and further generated by degradation of larger cuttings pieces, not only become mobile, but are actually pulled away from other larger solids they would otherwise be able to cling to. The fluidity of the liquids phase actually provides mobility to the micron sized solids, by carrying them through the wedge wire screen. This is why the recovered drilling fluid requires additional rehabilitation through horizontal decanter centrifuges, which is unable to remove the low gravity solids. It is important to note that Verti-G dryers do not like process upsets like that of the feed consistency changing. When for example, the wetness, temperature, age or integrity of the liquid and solids phase changes, a Verti-G typically requires the operating parameters to be altered for the new feed consistency.

Efforts have been made to enhance the operation of vertical cuttings dryers, for example, as described in International Publication Number WO 03/102359 and U.S. Pat. Nos. 5,256,289, and 6,763,605, and 6,711,830, to remove larger amounts of the recoverable hydrocarbons and water. These documents disclose the use of abrasion resistance components, adding heat energy to the feed stock to make the oil phase less viscous, and using additives including for example, solvents and surfactants (et al) to enhance the recovery of the liquids phase using a vertical cuttings dryer. However, making the equipment more abrasion resistant reduces repair costs, it doesn't address the problem of only being partially effective at removing the liquids phase and the substantive rehabilitation thereof. Less viscous oil is certainly advantageous to the operation of the vertical cuttings dryer, but additional heat energy can be a significant economic investment and both the liquids phase and solids phase absorb the heat energy, much of which is lost once the solids are dropped from the vertical cuttings dryer. Further, while the addition of heat can facilitate a better separation, too much heat can cause volatiles that were trapped in the liquids phase during the drilling of the well to become airborne, which is a significant concern for both the health and safety of workers. While the addition of a solvent to mix with the cuttings would reduce the viscosity of the liquids phase, and aid in cleaning the unstabilized drill cuttings, U.S. Pat. No. 6,711,830 does not disclose the use of gas tight equipment to prevent volatiles from escaping the process, or oxygen from entering the process. Given that there are high speed rotating components, and the possibility of equipment fatigue and failure, a safe work place requires the equipment be built to ensure there is no possibility of an explosion or fire. Lastly, the use of a low flash point solvent mixed with the cuttings feed stock, like for example, in U.S. Pat. No. 6,711,830, would result in some of the solvent remaining in the recovered liquids phase thereby making the oil un-useable by a drilling rig as an oil based drilling fluid. Regulations in most jurisdictions require that fluids have a flash point greater than 60° C., to reduce the risk of fire at the jobsite.

As described herein, these problems and others in this area are addressed with the systems, methods and apparatus described herein. The system disclosed herein pertains to the use of a gas tight vertical cuttings dryer to simultaneously wash and separate the components of a slurry into a first solids phase with a lower liquids content, and a second liquids phase with a lower solids content.

While wetter drill cuttings typically represent an opportunity for more recoverable hydrocarbons, such as oil, which is clearly better from an economic standpoint, wetter cuttings typically means the separation process needs to be run slower or cuttings cleanliness is sacrificed. A vertical cuttings dryer is a unique design in that it has a significantly higher through put than other mechanical forms of separation, while being significantly less capital cost than competing forms of mechanical separation.

To increase the wet OBM cuttings feed rate, or to increase the low gravity solids (LGS) separation rate, or to increase the solids dryness, or all, or some of the foregoing, a low viscosity, low density diluent is added to further wet the cuttings by dissolving into the liquids phase of the feed. The diluent must be chosen for its specific characteristics, but for the purposes of this invention, generally diluents with a vapor pressure (corrected to 20° C.) equal to or greater than about 0.1 Torr and less than about 750 Torr, and further having a flash point of less than about 37° C., will quickly dissolve into solution with the oil in the OBM and lower or eliminate the yield strength and lower the viscosity, for example, hexane, n-butyl alcohol, ethyl acetate, etc. The diluent should be added prior to the drilling waste being fed into the gas tight processes, to facilitate the best recovery results of both processed solids and liquids volumes.

Figure 2:
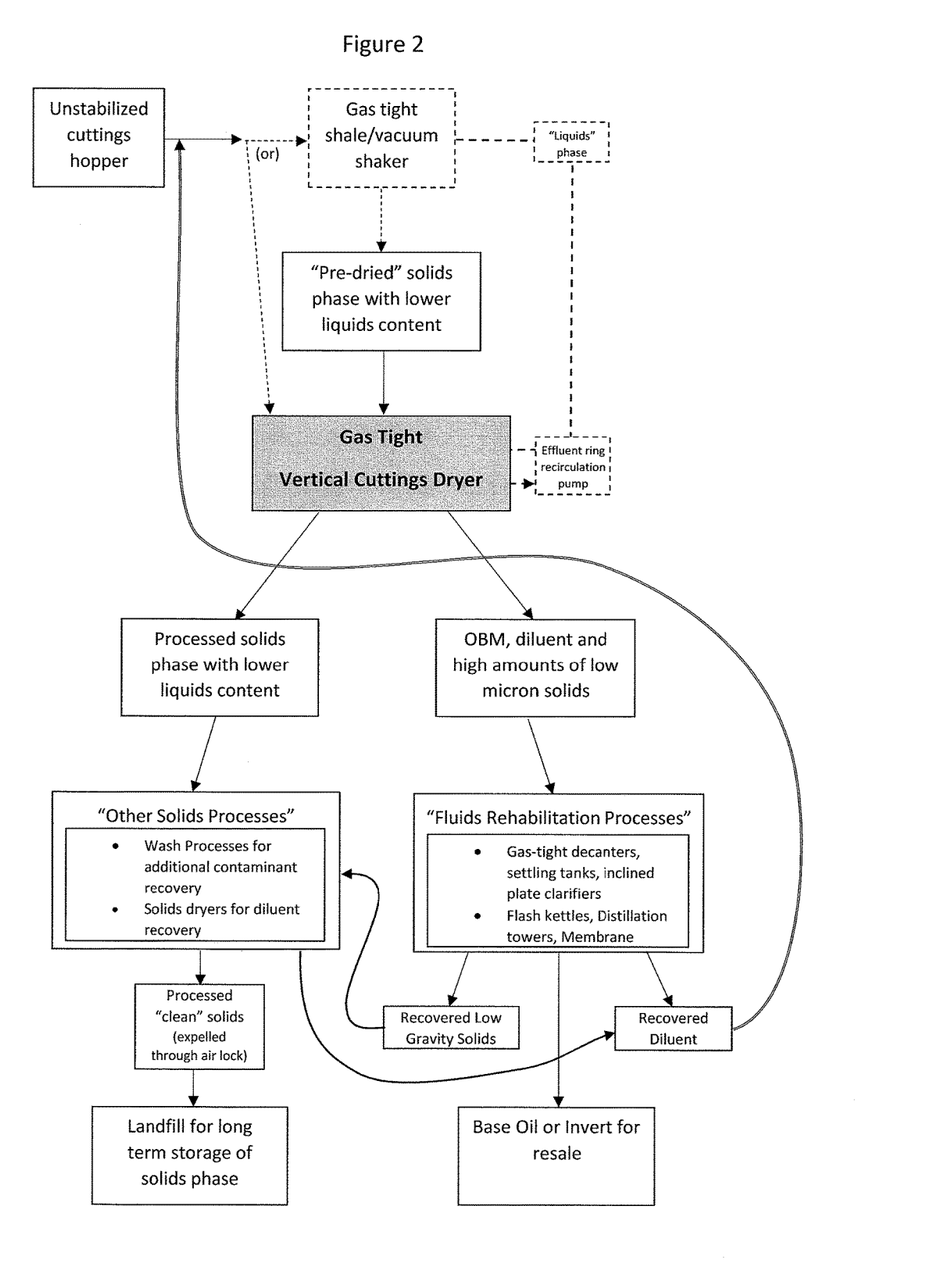
FIG. 2 is a flow chart demonstrating an example of diluent added to the feed of a gas tight vertical cuttings dryer.

FIG. 2 is a flow chart demonstrating the movement of the liquids phase and solids phase, relative to other processes. As demonstrated by the figure, the gas tight vertical cuttings dryer is to be used as the primary washing mechanism and the processed drilling waste (solids with very low fluids concentrations) is then moved to a solids drying process for diluent recovery. Alternatively, following removal of substantially all of the oil base drilling fluid, the processed drilling waste could be moved to a chlorides wash system, to remove less visible contamination, beyond the obvious hydrocarbon contamination of the unstabilized cuttings feed product. The gas tight vertical cuttings dryer is intended for maximum liquids removal from solids, which will also result in low gravity solids being carried with the liquids phase. Additional fluids rehabilitation is thus desirable/advantageous, which is facilitated by means of a gas tight liquids polishing decanter wherein additional diluent could be added to better facilitate a complete low gravity solids removal from the liquids. Settling tanks, such as inclined plate clarifiers or auger tanks operate slower, but they could also be used. Once separation of the low gravity solids is complete, the liquids phase consisting of diluent, oil and less than 1% (by volume) low gravity solids is sent to flash kettles, or distillation equipment for diluent recovery.

Figure 3A:
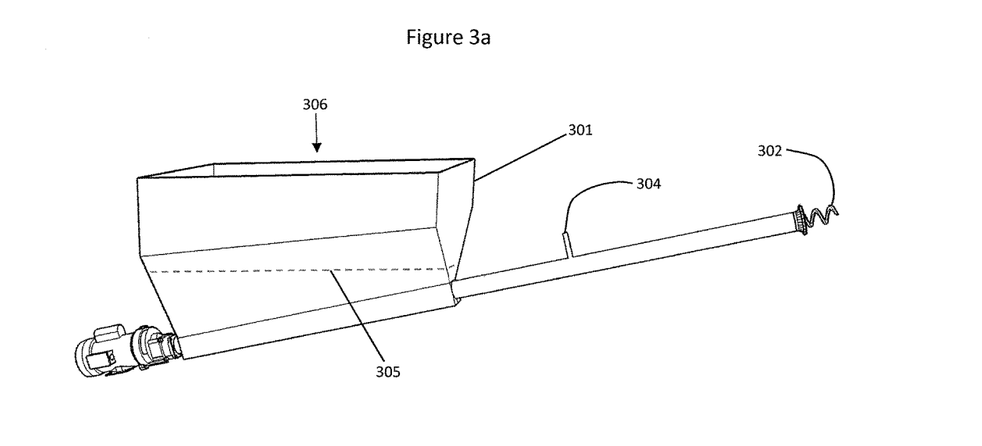
FIGS. 3a and 3b depict a hopper and auger conveyance system.
Figure 3B:
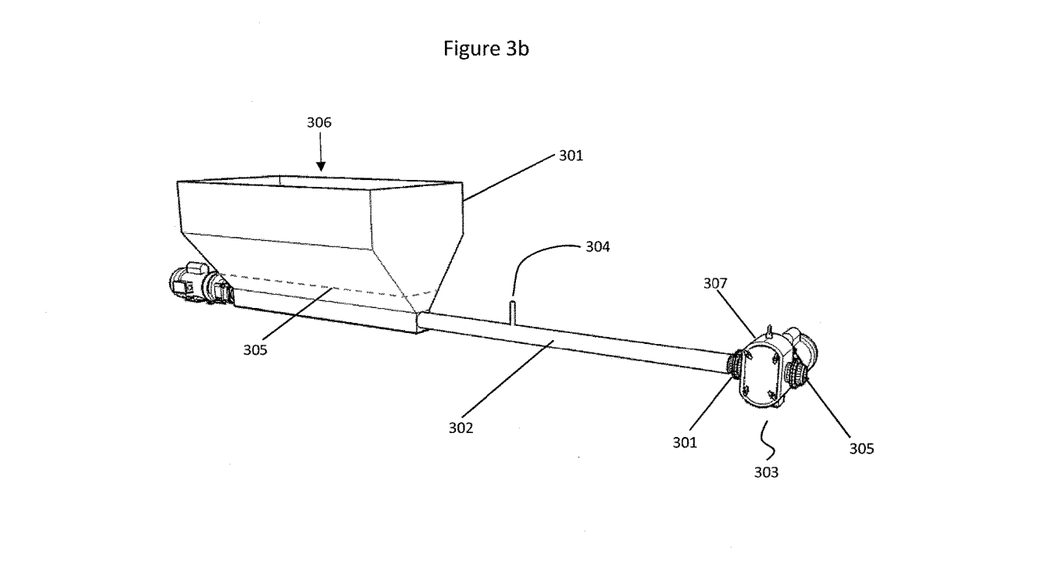

The drilling waste (a mixture of oil base drilling fluid and drill cuttings) is received and stored until the facility is ready to process the waste. As illustrated in FIGS. 3a & 3b, the unstabilized drill cuttings are loaded into a hopper (301) which maintains a minimum volume (305) over the feed auger (302), which is essentially a fluid leg that prohibits the entry of unwanted air to the process, or the escape of a volatile diluent to the atmosphere. The safe minimum level of unstabilized drill cuttings in the hopper can be controlled either by means of a weight indicator on the hopper (not shown) or overhead level transducer (not shown), or by operator observation. The process feed rate is controlled by a feed auger (302), rotary air lock (not shown), or feed pump (303), which creates a solids trap while permitting conveyance of the solids to occur at a controlled and measured rate, also known as characterization of the flow. A secondary shale shaker can also be used at this point to pre-dry the cuttings and provide a lower consistency of wetness to the Verti-G. As described herein, this results in the safe and accurate conveyance of unstabilized drill cuttings into a chemical/mechanical process while maintaining a gas tight barrier between the storage device and the process equipment.

Diluent is added (304) to the unstabilized drill cuttings feed auger (302) to allow the less viscous diluent to mix with the cuttings feed, thereby causing the OBM liquid in the wet cuttings feed to have a lower yield point, or to eliminate the yield strength entirely, and lowering the viscosity of the liquid, and facilitating separation of the liquids phase and solids phase when they are subjected to gravitational or centripetal forces to settle and separate the solids from the liquid. The rate of diluent additions is sufficient to eliminate or significantly reduce the yield point and to reduce the (plastic) viscosity of the liquids phase in the unstabilized drill cuttings feed. The length of the conveyor between the hopper and the inlet of the feed tube of the gas tight vertical cuttings dryer is of less importance to the embodiment except that the length must be long enough to ensure there is adequate mixing of the diluent and unstabilized drill cuttings during the term of conveyance. The volume of diluent added to unstabilized drill cuttings would be approximately 1:1, with a minimum ratio being 1:5, and a maximum ratio being 5:1. The "ideal ratio" of diluent to unstabilized drill cuttings could be influenced by capital cost of the equipment, operating costs for the facility, and throughput versus maximizing drilling fluid recovery. Table 1 has been included to show the expected yield point (represented in pascals Pa) and Plastic Viscosity PV (represented in centipoise cP) of a mixture of diluent and the liquids phase of unstabilized drill cuttings. For the purposes of obtaining representative data for Table 1, hexane was used as the diluent.

TABLE 1

| Ratio of diluent to unstabilized drill cuttings | Temperature | Resulting PV (cP) | Resulting YP (Pa) |
| --- | --- | --- | --- |
| 0:1 | 50° C. | 25 | 4.5 |
| 0:1 | 0° C. | 89 | 12 |
| 0.1:1 | 0° C. | ~4.9 | ~1.3 |
| 0.5:1 | 0° C. | <1.0 | <1.0 |
| 1:1 | 0° C. | ~0.5 | ~0.5 |
| 1.5:1 | 0° C. | ~0.5 | <0.5 |

The rotating components inside a typical Verti-G dryer causes gasses, vapors and mist to be produced and emitted from the inlet or outlet openings, as well as unsealed openings like that of the inspection doors, and the liquid ring circulation system and supporting decanter, if equipped. This problem is of significant concern when the diluent is selected from those which include the characteristics of a (gauge) vapor pressure that is greater than or equal to 0.1 Torr and less than 750 Torr (all Torr measurements described herein have been corrected to a gauge pressure at 20° C.), and having a flash point of less than 37° C. In cases where the properties of diluent, or properties of the diluent and unstabilized drill cuttings combined are within the aforementioned parameters, then safety, due to toxicity of the gas, vapor or mist, or due to flammability of the mist, vapor, or gas is a serious concern. A solution to all these issues is to hermetically seal the Verti-G dryer by building the dryer with shaft seals, a flanged and gasketed cover to contain volatiles, and sealing the inlets and outlets of the dryer with flanged connections which allow a flexible conduit or bellows to isolate process vibration. Also, it is essential that the atmosphere within the process be substantially purged of oxygen so that if a source of ignition was created either by operator error, equipment breakdowns, mechanical fracture or unforeseen circumstances in general, the atmosphere will not support ignition and subsequent fire or explosions.

The unstabilized drilling waste is conveyed into the vertical cuttings dryer through either:

a) a conventional auger (302) or augers, depending on positioning or elevations of various components of the process or, a minimum term for adequate mixing of the diluent (304) and unstabilized drill cuttings (306);

b) positive displacement pump, for example, a progressive cavity pump or rotary lobe pump (303), wherein a conventional auger (302) would either force feed the inlet of the pump (301), or allow the viscus slurry to fall into the inlet of the pump such that the pump lobes can facilitate the positive displacement motion within the casing of the pump (307), causing the slurry to exit the pump (305) with a velocity sufficient to keep the solids phase uniformly distributed during conveyance.

Either conveyance method will allow diluent to be mixed with the solids during the conveyance.

Figure 4A:
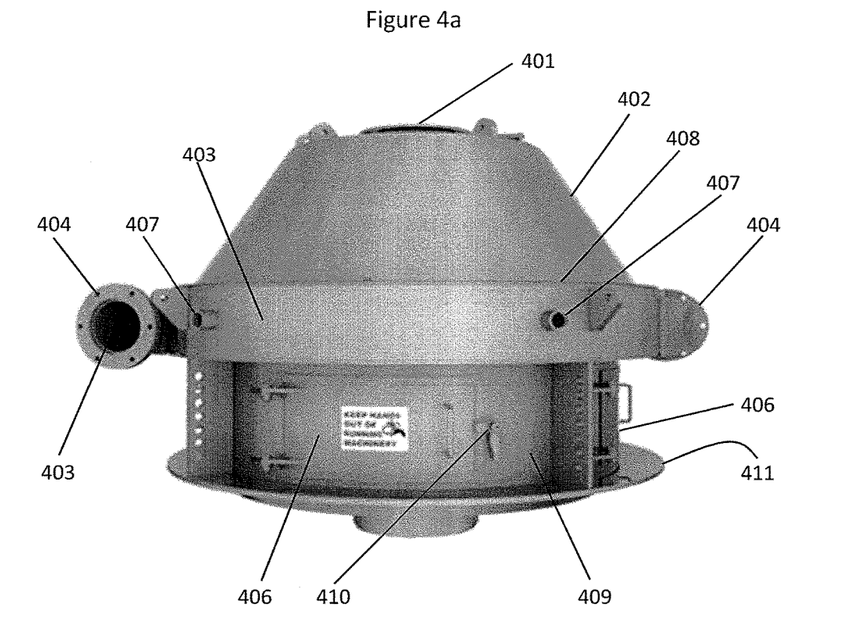
FIGS. 4a and 4b depict an exemplary exterior view a vertical cuttings dryer described herein and FIGS. 4c and 4d an exemplary interior view.
Figure 5:
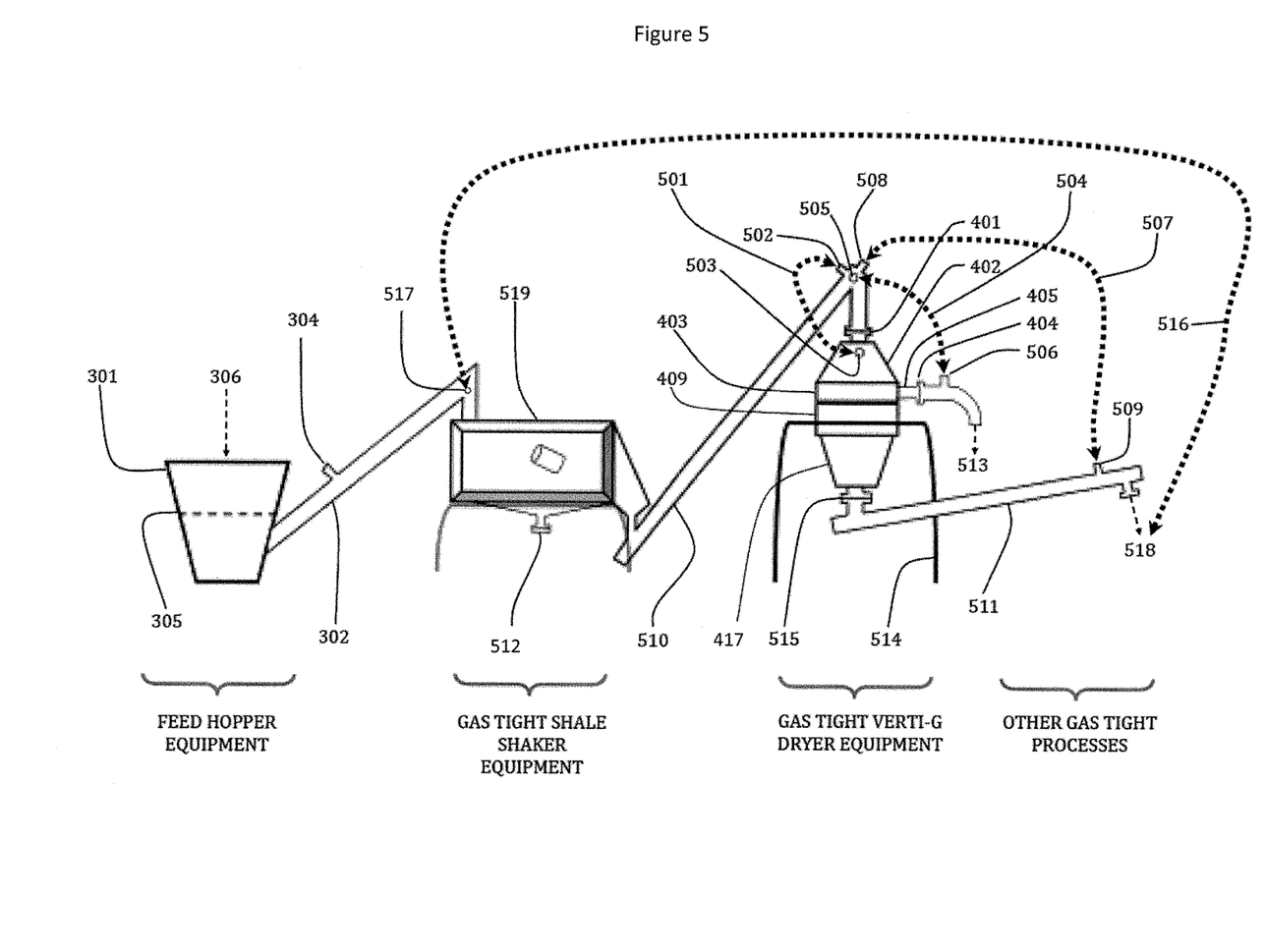
FIG. 5 depicts an exemplary layout of the vertical cuttings dryer system described herein.

Ideally, given that vertical cuttings dryers do not like process upsets and they are best employed when the unstabilized drill cuttings feed is consistent, for example, not too wet (with OBM) and not too dry (lacking OBM), the unstabilized drill cuttings (306) can be first conveyed from the feed hopper (301) to a gas tight shale shaker (519) as a process to stabilize the feed consistency, prior to being conveyed by means of a second conveyor (510) to the flanged inlet (401) of the vertical cuttings dryer. See copending, commonly assigned U.S. Patent Application Ser. No. 62/303,169, entitled Gas Tight Shale Shaker For Enhanced Drilling Fluid Recovery And Drilled Solids Washing, filed of even date herewith, the disclosure of which is herein incorporated by reference. The recovered liquids phase (512) from the gas tight shale/vacuum shaker should be directed to the inlets (407) of the vertical cuttings dryer effluent ring to promote proper and continual cleanout of the effluent ring (403).

A field trial was conducted to test the effectiveness of sealing a vertical cuttings dryer to make the operation gas tight, while adding a diluent to the feed stock. A CSI (Centrifugal Services, Inc.) vertical cuttings dryer (model WSM-01) with a 75 HP explosion proof motor (420) and a through-put rating of 40-60 tons per hour was utilized during the field trial. Unstabilized drill cuttings were brought in from a drilling rig and a retort was conducted to determine there was 31% (by volume) oil on cuttings. Hexane was used as the diluent during the field trial. FIG. 5 is an illustrative flow chart of the embodiment described within, fed by a pre-drying shale shaker, all within a common gas tight atmosphere, but the shale shaker was not included as part of the field trial.

Extensive alterations were required to ensure that the atmosphere within the vertical cuttings dryer was sealed to ensure oxygen could not enter the process and vapors from the diluent or unstabilized drill cuttings, or the mixture of the two, could not escape the dryer. In an effort to ensure the gaseous vapor could not escape, sealing systems were used along any area that could be opened or detached during equipment inspection or repair. Examples of the sealing mechanisms added to the vertical cuttings dryer include the following:

1) The unstabilized drill cuttings hopper (301) was built such that there was always a minimum volume (305) of unstabilized drill cuttings (306) covering the conveyor (302) being used to move the drill cuttings to the vertical cuttings dryer. The conveyor section was purged with nitrogen gas from other processes (518) to ensure rotating components were turning within an inert area. Diluent was pumped into the conveyor casing through the diluent feed tube (304) at a predetermined ratio to allow the drill cuttings to sufficiently mix prior to being fed into the vertical cuttings dryer.

Figure 4B:
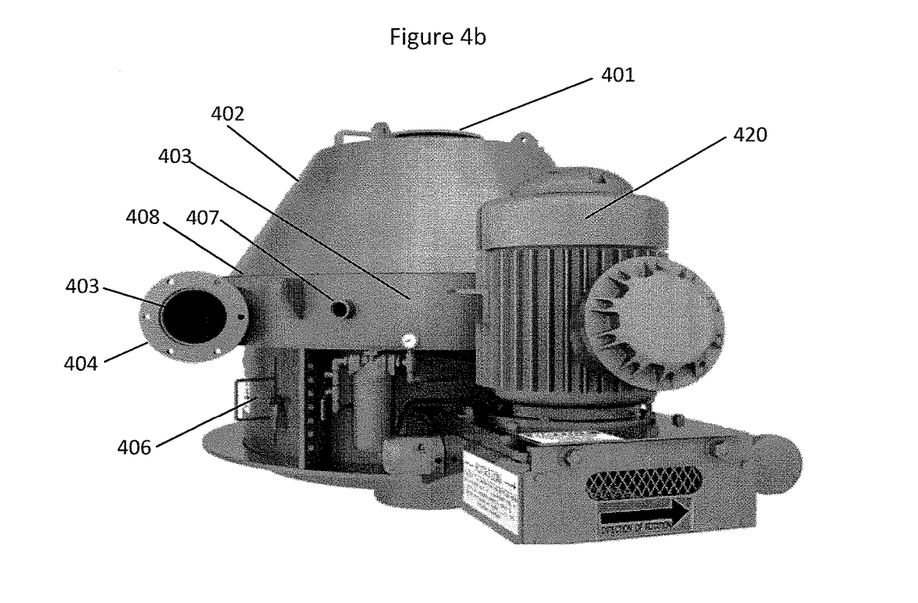
Figure 4C:
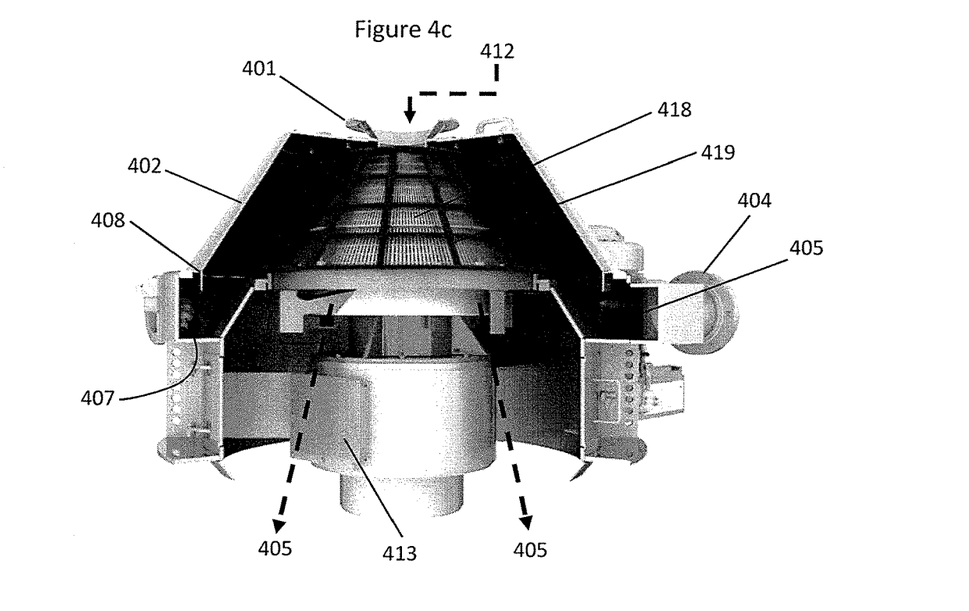

2) The feed inlet (412) was designed to include a funnel so that the feed conveyor (302) could simply "pour" the feed stock into the feed inlet while still allowing airflow to be exchanged through the feed inlet and the processed solids outlet hopper (417). Efforts were made to allow the feed conveyor (302) to be close coupled to the inlet flange (401). A silicone (suitable for hydrocarbon use) was used to seal the inlet flange (401) to the feed conveyor (302).

3) The vertical cuttings dryer featured two outlet ports (404) to allow the liquids phase to escape the effluent ring (403). Each outlet port came equipped with a factory installed flange (404) which allowed for an easy means of connecting the effluent outlet to an additional gas tight process 4) The WSM-04 model came with three inspection doors (406) which were installed along the lower body casing (409) and they could easily be opened or closed to inspect for an accumulation of solids within the outlet hopper section (417). While each inspection door (406) was built of rigid materials and securely locked in place by means of a locking handle (410), there was clear and open gaps between the lower body casing (409) and the inspection door (406). A combination of rubber and silicone was needed to create a seal and prevent what would have been an obvious point of gaseous exchange.

5) The vertical cuttings dryer sat over the outlet hopper (417) which was supported by a rigid metal stand (514). Prior to the lower body flange (411) being set on the flange section of the outlet hopper (417), substantial amounts of silicone was laid on the two flange sections (and permitted to dry prior to use) to ensure it was sealed to prevent a gas exchange.

6) The effluent ring (403) also featured four 2" NPT (National Pipe Thread) inlets (407) which served to be a connection point for an effluent pump to deliver a volume of liquids suitable to keep low gravity solids in suspension, to prevent settling in the effluent ring. Given the inlets (407) were threaded, plugging the otherwise open holes was quite easy.

7) The lower hopper section (417) looks very similar to the dome section (402) which encloses the cone (414), screen (418) and basket (419) sections, which typically rotate at 400 to 500 RPM (revolutions per minute). The lower hopper section required that a custom flange be built (515) to ensure the lower hopper section was rigidly connected and sealed to the lower conveyor (511), which was used to convey the processed drill cuttings to another gas tight process (518).

8) The WSM-04 model also featured four other smaller inspection doors (not shown) in the dome cover, to allow the operator to open and inspect the process when in operation or while the equipment was not in use. Each of the four doors needed a combination of thick gasket rubber and silicone to sufficiently seal the removably attached doors from allowing a gaseous exchange.

9) The dome cover (402) sat over the effluent ring creating a liquids splash barrier to prevent the escape of the liquids phase (513) from leaking out of the enclosure, prior to dropping into the effluent ring. While the dome cover come with a fitted flange to bolt it to the effluent ring, substantial amounts of silicone were laid on the two flange sections (408) (and permitted to dry prior to use) to ensure it was sealed to prevent a gas exchange.

The entire process was filled with nitrogen rich air and monitored using an oxygen analyzer to ensure foreign air was not entering the gas tight process. The procedure of completing the gas tight modifications, filling the volume with nitrogen, conducting leak detection experiments, and conducting air measurement tests took three weeks to complete.

Figure 4D:
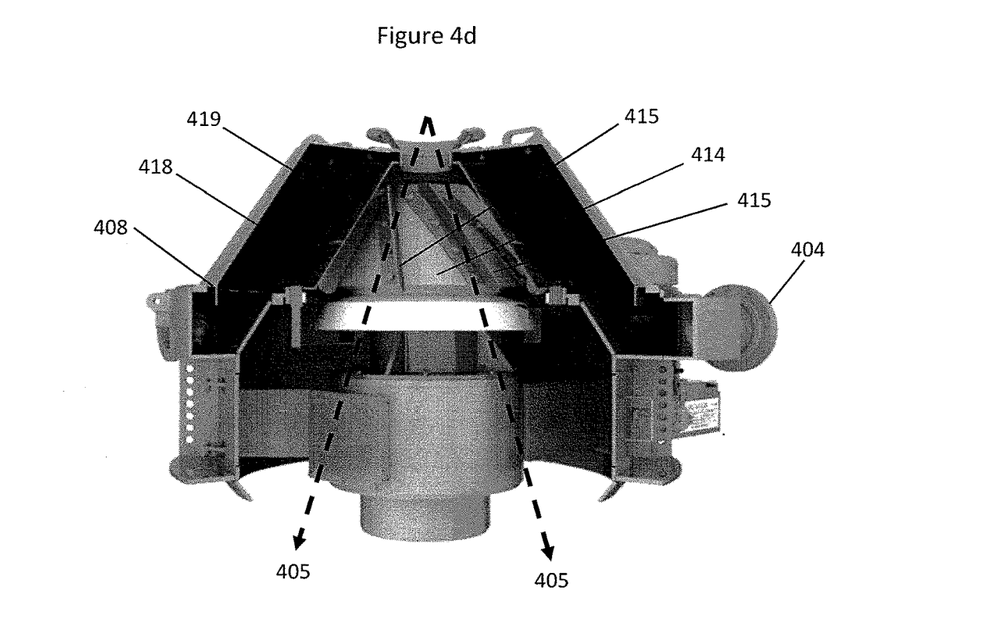

Making the gas tight nature of the vertical cuttings dryer worse, is that the vertical cuttings dryer was not designed, or usually capable of running without an air exchange across and through the screen system. In fact, many operators use centrifugal fans to introduce new air to the process through either the feed inlet (412), or through the dome section (402), wherein the new air is directed to travel through the rotating screen (418) using a product commonly known as an air knife (not shown). As described above, the vertical cuttings dryer uses centripetal force to throw the unstabilized drill cuttings against the screen (418) where the cuttings are held by gravitational forces. Blades/scrapers (415) mounted to the cone section (414) are used to drag the cuttings feed downward by scraping (conveying) cuttings along the screen (418). The process causes a portion of the liquids phase to be thrown off the drill cuttings and through the screen where it impacts the inner side of the dome cover (402) and falls into the effluent ring (403). An unintended but unavoidable consequence of the conveyance is that it simultaneously causes particle degradation of the drill cuttings. As the drill cuttings degrade by the scraping action, the smaller micron particles are mobilized with the liquids phase which move through the small openings of the screen section.

Further, as larger drill cuttings become smaller drill cuttings, the smaller pieces become capable of becoming lodged into the openings of the screen section, thereby plugging the screen. To combat this problem, many operators employ what is commonly known as an air knife (not shown) and/or a liquid knife (not shown) to keep a portion of the screen section clear of small particle induced blockages so that the liquids phase can continue to pass through at least a portion of the screen section. The air or liquid knives, or both, are installed between the screen and the inner side of the dome cover (402) and they force a thin column of air or liquids against the screen, opposite the direction the recovered liquids phase is traveling to escape the scraping action. This causes any small particles that have become lodged in the screen to be blown back onto the cone or blades section, allowing free liquids trying to escape the cone section to flow back through the previously blocked screen.

Given that the hypothesis of the field trial was written to add a low flash point diluent to be the feed, and given there are rotating components that could fracture during the trial, it was essential that the gas tight nature of the process be maintained. As such, not only were the aforementioned methods of sealing the equipment to create a gas tight process used, but additional air ducts were installed to ensure there could be a turbulent air exchange within the gas tight vertical cuttings dryer. For example, air ducts were incorporated in the following areas to permit a cross exchange of inert air within the process:

1) An 8" round duct (501) was installed between 502 and 503
2) An 8" round duct (504) was installed between 505 and 506
3) An 8" round duct (507) was installed between 508 and 509
4) A 2" round duct (516) was installed between 517 and 518 to supply the feed conveyor (302) with a supply of inert air which moved throughout the gas tight process to ensure the possibility of fire or explosion was removed;

Given that most operators obtain the best results from a vertical cuttings dryer when they are adding additional air flow or speeding up the velocity of the air flow, the exchange of inert air was further induced using blowers capable of supplying positive airflow within the inert atmosphere, ranging from as little as 500 CFM (cubic feet per minute) and as much as 3000 CFM.

During the field trial, unstabilized drill cuttings were fed by the feed hopper and mixed with hexane at a very low ratio to what is common in other wash processes, in an effort to not cause the feed material to become "wetter", which is typically an upset condition for vertical cuttings dryers. The ratios employed for the field trial were 100 liters of hexane to 1,000 liters of unstabilized drill cuttings and, 200 liters of hexane to 1,000 liters of unstabilized drill cuttings.

Several screen sizes were used during the field trial to determine if narrower or wider screens resulted in an enhanced recovery of oil base drilling fluid. Lacking the resources necessary to incorporate an air or liquid knife, one was not included for the field trial. As a result, the process was shut down during the testing to manually clean the screen using a pressure washer.

Prior to conducting the field trial, the manufacturer expressed concern over sealing the lower inspection doors (406) and upper inspection windows (not shown) because it is common to gain entry through these ports to manually remove the accumulation of solids along the inside of the discharge hopper (417) and ensure the effluent ring (403) remains clear of accumulating low gravity solids, which can be detrimental to the operation of the vertical cuttings dryer. Also, opening the lower inspection doors (406) was the only way to gain access to the belt drive pulleys, which were protected by an inspection cover (413), in side of the unit.

It is important to note, the addition of hexane with the feed of unstabilized drill cuttings caused the effluent ring (403) to remain clean, even without a secondary installed effluent ring circulation system (which was not included as part of the manufacturers vertical cuttings dryer package). Further, despite monitoring the discharge hopper for solids accumulations, the reduced oil content in the processed solids (405) allowed the drier nature of the solids phase to freely pass through the hopper section without accumulating in the hopper section, during the field trial.

The testing was conducted over several months and various samples were obtained of both the liquids phase and solids phase. The liquids phase was recovered, centrifuged using a gas tight horizontal decanter and sent to flash kettles for diluent recovery. The processed drill cuttings were conveyed to a solids drying process for diluent recovery. Samples were sent to an independent laboratory for analytical testing of residual hydrocarbons and the results showed a modest reduction when diluent was not added, while a significant reduction in hydrocarbon contamination was achieved when diluent was mixed with the feed of unstabilized drill cuttings before being conveyed into the gas tight vertical cuttings dryer. The results are recorded in Table 2.

TABLE 2

| OBM drill cuttings feed rate per hour | Diluent to Unstabilized drill cuttings feed rate | Feed temperature | Residual oil on cuttings (% wt.) |
|---|---|---|---|
| Unstabilized drill cuttings | — | n/a | 15.5% |
| "Dry run" 2 m³ best case results without diluent | 0:1 | 20° C. | 8.9% |
| "Dry run" 2 m³ typical results without diluent | 0:1 | 20° C. | 12.5% |
| 2 m³ (w/ diluent) | 1:5 | 20° C. | 5.49% |
| 2 m³ (w/ diluent) | 1:10 | 20° C. | 6.56% |

The methods and systems described herein meet the challenges described above, including, among other things, achieving more efficient and effective drilling waste processing. The scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A process for separating liquid phase-solid phase oil based drilling mud-containing drill cuttings, comprising flowing the drilling mud-containing drill cuttings through a vertical cuttings dryer to cause at least a portion of the liquid phase drilling mud to separate from the solid phase, wherein at least one diluent is added to the oil based drilling mud containing drill cuttings to lower the yield point of the diluent-liquid phase mixture and enhance liquid phase recovery, the entire process being performed in a gas-tight environment preventing escape of diluent from the process into the external atmosphere and preventing introduction of oxygen containing air into the process from the external atmosphere.

2. The process of claim 1 wherein the diluent is added to the oil based drilling mud containing drill cuttings prior to the mixture being conveyed into the vertical cuttings dryer.

3. The process of claim 1 wherein the recovered liquid phase from the vertical cuttings dryer is collected and processed in a gas tight decanter centrifuge so that additional solids can be removed from the liquid phase prior to distillation.

4. The process of claim 1, wherein the vertical cuttings dryer additionally contains a feed inlet, and a processed solids outlet, and a recovered liquids outlet, and additional vent inlets and outlets connected in a closed loop to promote a common atmosphere exchange.

5. The process of claim 4 wherein the atmosphere is exchanged at a rate greater than 500 cubic feet per minute and less than 3,000 cubic feet per minute.

6. The process of claim 4 wherein a gas tight fan or blower is additionally utilized to promote the atmosphere exchange.

7. The process of claim 1, wherein the at least one diluent is added to the oil based drilling mud-containing drill cuttings at a rate sufficient to reach a yield point of the liquids phase of the oil based drilling mud-containing drill cuttings equal to or less than 1.0 Pa, prior to the mixture entering the vertical cuttings dryer.

8. The process of claim 1, wherein a diluent is added to the drill cuttings at a rate sufficient to reach a plastic viscosity of the liquids phase of the oil base drilling mud-containing drill cuttings, equal to or less than 5.0 cP, prior to the mixture entering the vertical cuttings dryer.

9. The process of claim 1 wherein the at least one diluent has a flashpoint less than or equal to 37° C.

10. The process of claim 1 wherein the mixture of the at least one diluent and liquid phase-solid phase oil based drilling mud-containing drill cuttings has a flashpoint less than or equal to 37° C.

11. The process of claim 1 wherein the at least one diluent has a vapor pressure equal to or greater than 0.1 Torr and less than 750 Torr.

12. The process of claim 1 wherein the diluent is hexane.

13. The process of claim 1 wherein the diluent is n-butyl alcohol.

14. The process of claim 1 wherein the diluent is ethyl acetate.

15. The process of claim 1 wherein the gas-tight environment is maintained below the minimum oxygen content required for ignition of the diluent.

16. The process of claim 1 wherein the gas-tight environment additionally contains an inert gas.

17. The process of claim 16 wherein the inert gas comprises one or more of nitrogen, carbon dioxide, or fuel gas.

18. The process of claim 16 wherein the inert gas exerts a positive pressure in the process.

19. The process of claim 1, wherein the liquid phase is collected in an effluent ring of the vertical cuttings dryer and is sent for additional fluids rehabilitation within a commonly connected gas tight atmosphere.

20. The process of claim 19 wherein the recovered liquid phase from the effluent ring is collected and additionally processed in one or more of a gas tight settling tank, a gas tight clarifying tank or a gas tight decanter so that additional solids can be removed from the liquid phase prior to distillation.

21. The process of claim 1 wherein a diluent is added to the oil based drilling mud-containing drill cuttings and the mixture is processed within a gas tight shale shaker to provide a partial pre-separation of the liquids phase and solids phase of oil based drilling mud-containing drill cuttings into a liquids phase containing more or less solids and solids phase containing less liquids prior to the solids phase being conveyed to the vertical cuttings dryer.

22. The process of claim 21, wherein the liquids phase containing more or less solids from the gas tight shale shaker is collected and pumped to the effluent ring of the vertical cuttings dryer to flush the effluent ring.

23. The process of claim 1, wherein the solids phase containing residual diluent from the vertical cuttings dryer is operatively connected to a gas tight solids dryer to remove the residual diluent from the cleaned drill cuttings.

24. A drill cuttings cleaning system for cleaning drill cuttings contaminated with a hydrocarbon liquids phase comprising, a hopper or storage device for receiving the contaminated drill cuttings, operatively connected with the separation apparatus, including a hermetic seal between the contaminated drill cuttings feed hopper/storage device and the separation apparatus, wherein the rheology of the liquids phase is altered by adding a diluent so that the liquids phase has a yield point equal to or less than 1.0 Pa.

25. The system of claim 24, wherein the hermetic seal comprises a fluids or solids trap with at least one of a rotary airlock, a feed pump, or an auger to prohibit the entry of air containing oxygen to the process, or the escape of a volatile diluent to the atmosphere while permitting the contaminated drill cuttings to pass in a controlled, measured rate.

* * * * *